United States Patent [19]

Nakamoto et al.

[11] 4,448,276

[45] May 15, 1984

[54] CLUSTERED SWITCH MOUNTING MEANS FOR USE IN AUTOMOTIVE VEHICLES

[75] Inventors: Hiromasa Nakamoto; Takeshi Miyoshi, both of Hiroshima, Japan

[73] Assignee: Toyo Kogyo Co., Ltd., Hiroshima, Japan

[21] Appl. No.: 392,797

[22] Filed: Jun. 28, 1982

[30] Foreign Application Priority Data

Jun. 30, 1981 [JP] Japan .................... 56-102613
Jun. 30, 1981 [JP] Japan .................... 56-102614

[51] Int. Cl.³ ............................ B60K 37/06
[52] U.S. Cl. ..................... 180/90; D12/192
[58] Field of Search ............. 180/90; D12/192

[56] References Cited

U.S. PATENT DOCUMENTS

| D. 241,133 | 8/1976 | Gonzalez | D12/192 |
| 3,857,454 | 12/1974 | Kobayashi et al. | 180/78 |
| 3,946,827 | 3/1976 | Cadiou | 180/90 |

FOREIGN PATENT DOCUMENTS

| 2805583 | 8/1979 | Fed. Rep. of Germany | 180/90 |
| 54-18849 | 2/1979 | Japan | 180/90 |
| 2063789 | 6/1981 | United Kingdom | 180/90 |

Primary Examiner—Joseph F. Peters, Jr.
Assistant Examiner—Kenneth R. Rice
Attorney, Agent, or Firm—Burns, Doane, Swecker and Mathis

[57] ABSTRACT

An automobile instrument panel has a meter housing for supporting meters and various control switches. The switches are operatively coupled to respective manipulatable switch knobs which are grouped into two groups and mounted on the opposite lateral portion of the gauge covering. Each group of the switch knobs are arranged one above the other in a direction generally perpendicular to the longitudinal direction of the instrument panel and are supported for movement in a plane generally perpendicular to the plane of rotation of the steering wheel for controlling the associated switches.

10 Claims, 14 Drawing Figures

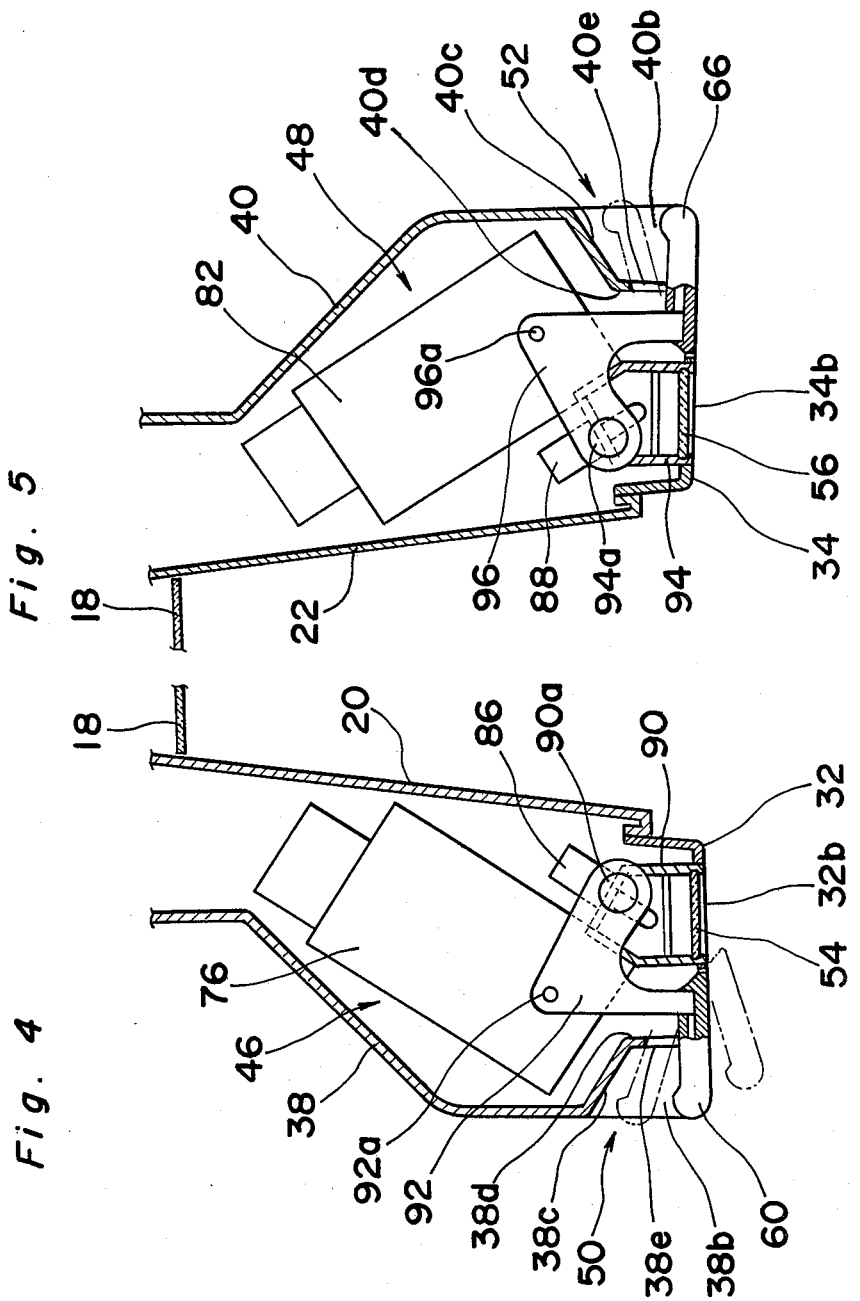

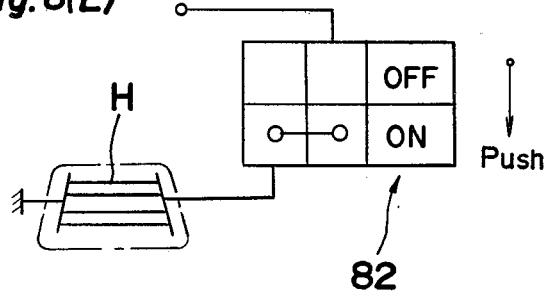
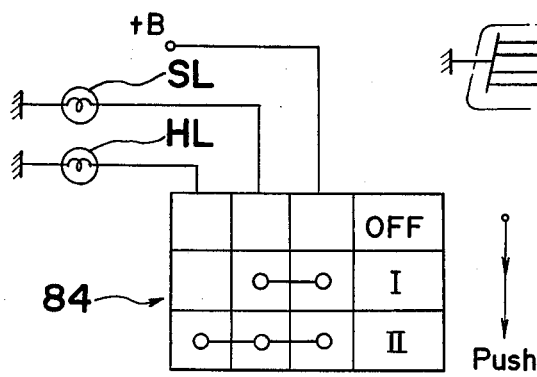
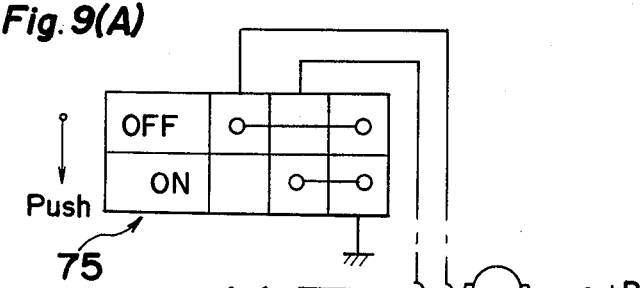
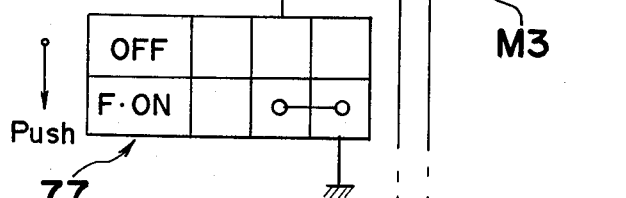
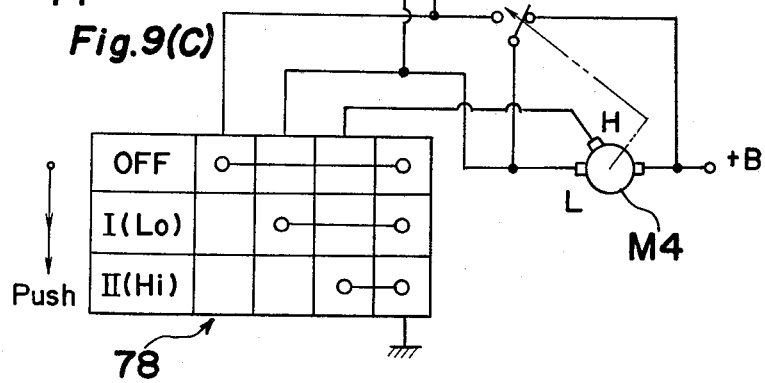

CLUSTERED SWITCH MOUNTING MEANS FOR USE IN AUTOMOTIVE VEHICLES

BACKGROUND OF THE INVENTION

The present invention generally relates to an automobile instrument panel and, more particularly, to an arrangement of various switches clustered or conglomerated on the instrument panel.

Various function-control switches used in a motor vehicle for controlling different mechanisms, such as wiper switch, headlight switch, hazard indicator switch, washer switch and others, are generally installed on an automobile instrument panel that spreads rearwardly of a stearing wheel and in front of the driver occupying the driver's seat inside the automobile. As a matter of course, care is taken to the layout of these switches to make them accessible to the driver, without the driver being forced to look aside and leave both of his or her hands from the steering wheel, and also to avoid any erroneous or unnecessary manipulation of one or some of these switches.

By way of example, the Japanese Laid-open Utility Model Publication No. 54-18849, laid open to public inspection on Feb. 7, 1979, in Japan, discloses an automobile instrument panel having a meter region, where a plurality of meters, such as speed meter, tachometer, temperature indicator, fuel indicator and others, are installed, and also having a generally rectangular-contoured hood surrounding the meter region and protruding outwards from the instrument panel towards the rear side of the steering wheel. Two function-control switch assemblies, each apparently comprised of a plurality of fixed contacts and a movable contact, are housed within respective casings positioned in the recess, which is defined by the meter region and the surrounding hood, and on the respective opposite lateral sides of the steering wheel clear of the meter display as viewed from the driver's seat. The movable contact of each switch assembly is coupled to a respective slide knob positioned exteriorly of the surrounding hood and movable along a respective lateral portion of the ridge of the surrounding hood adjacent the associated switch casing for controlling the associated switch assembly.

According to this Japanese publication, the fixed contacts of both switch assemblies are so arranged one above the other within the associated switch casings that each switch assembly can be controlled by moving the associated slide knob in a direction up and down as viewed from the driver's seat or, geometrically, in a direction generally perpendicular to the longitudinal sense of the instrument panel and parallel to the plane touching the ridge of the surrounding hood.

The arrangement disclosed in the above mentioned Japanese publication appears to be convenient in that, when one of the switch assemblies is desired to be controlled, the driver with his or her hands holding the steering wheel can control it merely by extending a finger so as to reach the associated slide knob without substantially leaving his or her hand from the steering wheel.

However, when it comes to the employment of a plurality of slide knobs for each lateral side of the steering wheel together with the corresponding number of the function-control switch assemblies, the slide knobs must be positioned one above the other, as viewed from the driver, along the respective lateral portion of the ridge of the surrounding hood. The facts that each slide knob must have a stroke over which it can be moved and that the width of the hood as measured from one point on the ridge to the opposite point on the ridge in a direction across the longitudinal sense of the instrument panel render it impossible or, if not impossible, difficult to conglomerate these switch assemblies on each lateral side of the steering wheel.

In addition, in view of the fact that some of the function-control switches generally used in the automobile are not always controlled or manipulated during the turning of the steering wheel, to make all of the slide knobs movable up and down as viewed from the driver's seat appears to render the steering operation annoying.

Separately from the above mentioned Japanese publication, the U.S. Pat. No. 3,857,454, patented in Dec. 31, 1974, discloses the switch assemblies mounted on a generally T-shaped housing having an axial member and a pair of wing members protruding in a direction generally perpendicular to and away from the axial member. This housing is comprised of a pair of housing halves of generally identical construction so mounted on the steering column and so clamped together that the wing members are located on left-hand and right-hand sides of the steering wheel as viewed from the driver's seat. The switch assemblies are positioned around respective free end portions of the wing members for the access to the driver's hands and are not conglomerated on the instrument panel adjacent the meter region.

SUMMARY OF THE INVENTION

The present invention has for its essential object to provide a clustered switch mounting effective to accommodate at least one plurality of switch assemblies at one lateral side portion thereof with no relatively large space required for the installation of respective manipulatable switch knobs thereat.

Another important object of the present invention is to provide a clustered switch mounting of the type referred to above, wherein the respective manipulatable switch knobs are so arranged one above the other in a direction generally perpendicular to the longitudinal sense of the instrument panel and generally parallel to a plane of rotation of the steering wheel as to improve both the manipulativity of and the accessibility to any one of the manipulatable switch knobs.

A further object of the present invention is to provide a clustered switch mounting of the type referred to above, wherein where two mechanisms in an automobile are desired to be simultaneously operated, it can readily and simply be achieved merely by pushing or pulling the neighbouring two manipulatable switch knobs associated respectively with such mechanisms.

A still further object of the present invention is to provide a clustered switch mounting of the type referred to above, which has a good-looking appearance and is, therefore, comfortable to look at and which may provide an attractive addition to the automobile interior decoration.

These objects of the present invention can be accomplished by providing the automobile instrument panel with a meter covering protruding outwardly from the instrument panel generally towards the steering wheel and surrounding the various meters necessitated in the automobile. The meter covering has a display window defined therein for the display of the meters therethrough and comprises an overhang portion positioned above the meter window and protruding generally towards the steering wheel and a pair of opposite lateral portions protruding laterally of the meter window and generally towards the steering wheel. At least one of the lateral portions of the meter covering accommodates therein a plurality of switch assemblies, each having a manipulatable switch knob, and has a recess defined therein for the accommodation of the respective manipulatable switch knobs.

Within the recess in at least one of the lateral portions of the meter covering, the manipulatable switch knobs are so positioned and so arranged one above the other in a direction generally perpendicular to the longitudinal sense of the instrument panel (i.e., to the widthwise direction of an automobile body structure) and in a plane generally parallel to a plane of rotation of the steering wheel that any of the switch assemblies can be controlled merely by pulling or pushing the associated manipulatable switch knob.

Since the direction in which any one of the manipulatable switch knobs is pushed or pulled is generally perpendicular to the plane of rotation of the steering wheel, the clustered switch mounting system according to the present invention is effective to accommodate two or more switch assemblies at one or each side of the meter window without requiring the increased space for the installation thereof.

Preferably, each of the manipulatable switch knobs is in the form of a piano key and has its axis of pivot extending generally in parallel to the plane of of the steering wheel and in a direction generally perpendicular to the longitudinal sense of the instrument panel, with the respective axis of pivot of the switch knobs being aligned with each other.

This arrangement of the manipulatable switch knobs is advantageous in that, depending on the type and function of the mechanisms to be controlled by the associated switch assemblies, no complicated and expensive electrical circuit connection from one switch assembly to another is required. Specifically, while it is a current proposal to use an electrical circuit connection for the purpose of making it possible to cause a wiper switch for controlling windshield wipers to be turned on simultaneously with the switching-on of a washer switch for controlling a windshield washer pump for, when the washer switch is turned on, jetting a washing liquid onto the windshield, the arrangement of the present invention makes it possible to achieve a similar function without utilizing such electrical circuit connection, merely by simultaneously pulling or pushing the neighbouring two manipulatable switch knobs of the wiper and washer switch assemblies.

BRIEF DESCRIPTION OF THE DRAWINGS

These and other objects and features of the present invention will become clear from the following detailed description thereof taken in conjunction with a preferred embodiment of the present invention with reference to the accompanying drawings, in which:

FIGS. 4 and 5 are cross-sectional views, on an enlarged scale, taken along the respective lines IV—IV and V—V in FIG. 1;

FIGS. 8a–8f illustrate electrical wiring circuits for respective switch assemblies mounted on the meter covering; and FIG. 9 illustrates a modified form of the electrical wiring circuits shown in FIG. 8.

DETAILED DESCRIPTION OF THE INVENTION

Figure 1:
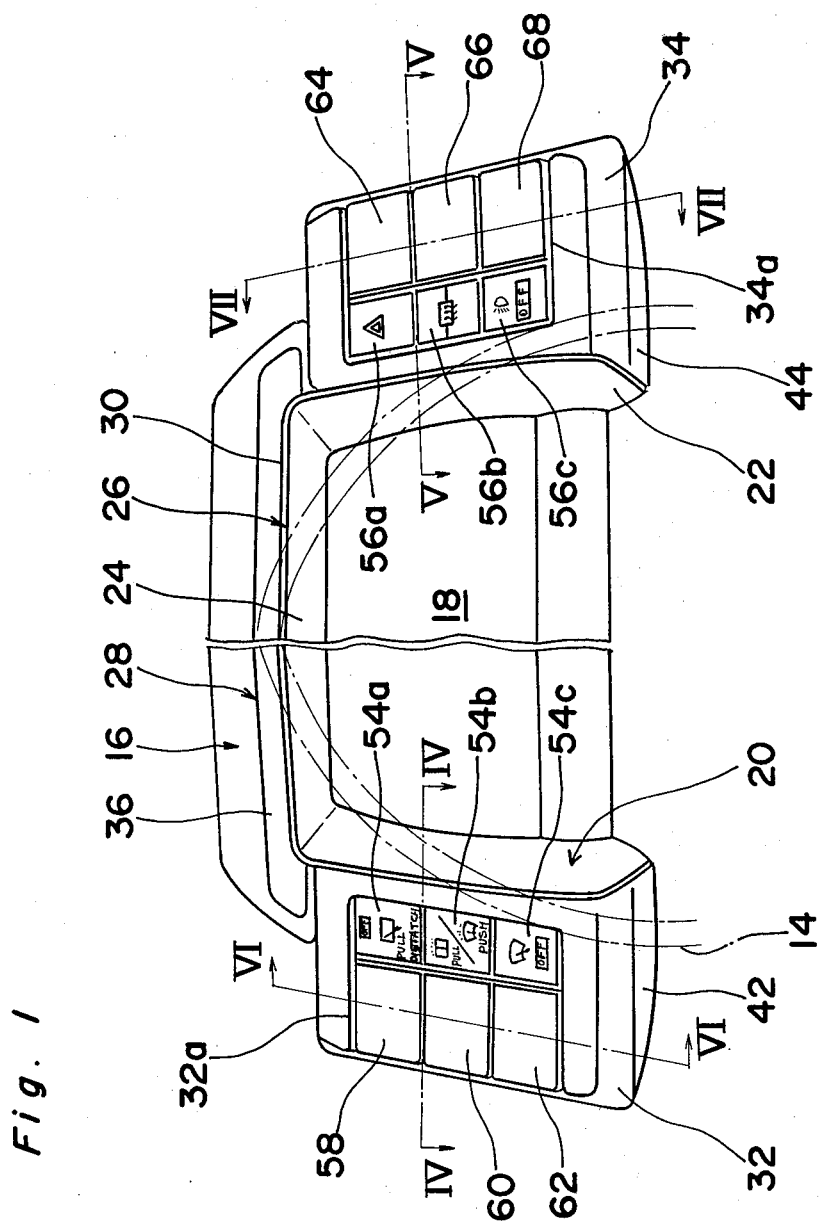
FIG. 1 is a front elevational view of a gauge covering embodying the present invention.

Before the description of the present invention proceeds, it is to be noted that like parts are designated by like reference numerals throughout the accompanying drawings.

Figure 2:
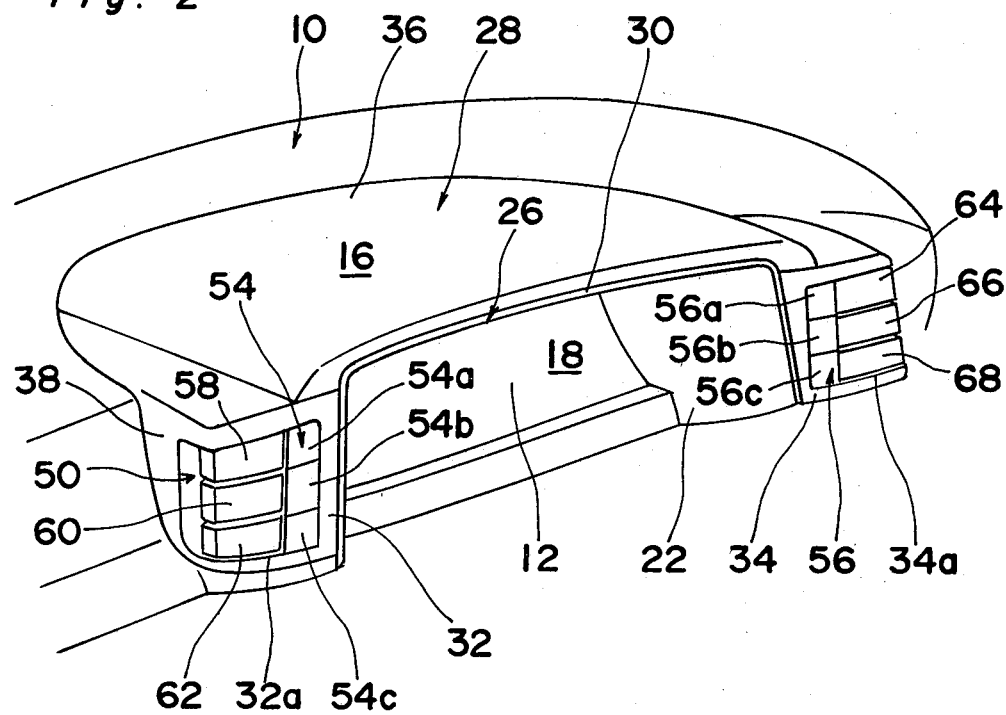
FIG. 2 is a perspective view of the meter covering shown as provided on an automobile instrument panel facing a driver's seat with a steering wheel and its support being omitted.
Figure 3:
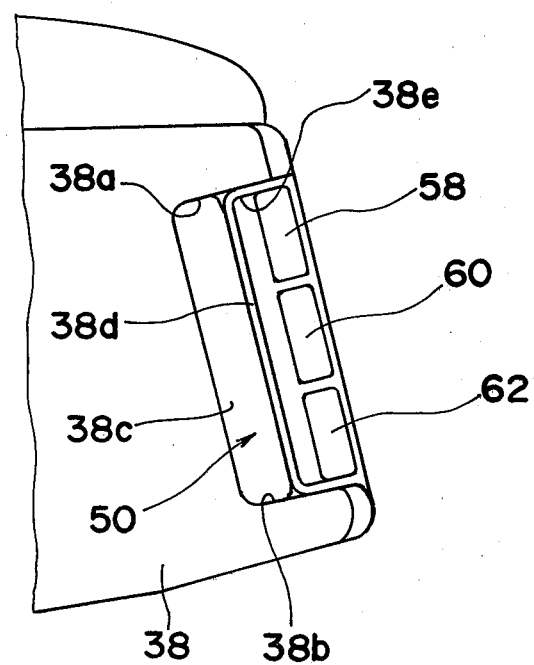
FIG. 3 is a side view of the meter covering as viewed from the left in FIG. 1.

Referring first to FIGS. 1 and 2, an automobile instrument panel 10 having its longitudinal sense extending widthwise of an automobile body structure at a position frontwardly of a driver's seat inside such body structure has a meter region 12 where a plurality of meters, such as speed meter, tachometer, fuel indicator, oil meter, coolant temperature indicator and others, are situated. This meter region 12 is located in front of the driver's seat and on one side of a steering wheel, shown by the phantom line 14 in FIG. 1, opposite to the driver's seat and is surrounded by a meter covering 16 secured to the instrument panel 10 in any suitable manner known to those skilled in the art and protruding therefrom towards the steering wheel 14 for shielding the meter region 12 from external light.

The meter covering 16 so far shown is of a configuration generally similar to the inverted shape of a figure "U" and protrudes from the instrument panel 10 so as to terminate in a plane generally parallel to, but spaced from, the plane in which the steering wheel 14 can be turned about its steering shaft (not shown). This gauge covering 16 has a meter window 18 through which the various meters are viewable and which may carry a window glass, and generally comprises an inner panel structure of one-piece construction having a pair of opposite inner side walls 20 and 22 and an upper wall 24 connecting the side walls 20 and 22 together so as to assume a generally inverted U-shape; a front panel structure 26 of generally inverted U-shape lying generally in the same plane in which the inner panel structure protruding outwardly from the meter window 18 towards the steering wheel 14 terminates; and an outer panel structure 28 surrounding exteriorly of the inner panel structure and connected thereto through the front panel structure 26.

The front panel structure 26 includes a generally elongated rim 30 having its opposite ends formed integrally with generally rectangular mounting walls 32 and 34 one on each side of the adjacent side wall 20 or 22 opposite to the meter window 18.

The outer panel structure 28 includes a top wall 36 overlaying the upper wall 24 in spaced relation thereto, a pair of opposite outer side walls 38 and 40 (FIGS. 4 and 5) continued from the top wall 36 and positioned exteriorly of the associated inner side walls 20 and 22 of the inner panel structure, and a pair of opposite bottom walls 42 and 44 (FIGS. 1, 6 and 7) continued from the adjacent outer side walls 38 and 40 and positioned on one side of the associated mounting walls 32 and 34 opposite to the top walls 36. As can readily be seen from FIGS. 1 and 4 to 7, the opposite lateral portions of the top wall 36, the outer side walls 38 and 40 and the bottom walls 42 and 44 cooperate with each other and also with the inner side walls 20 and 22 of the inner panel structure to define generally rectangular cross-sectioned chambers 46 and 48, respectively, each of said chambers 46 and 48 extending generally in a direction away from the plane of the elongated rim 30 and generally tapering towards the front of the automobile body structure. It is the mounting wall 32 and 34 which close the respective opening at one end of the chambers 46 and 48 facing towards the steering wheel 4.

So far shown, the meter covering 16 of the construction described hereinabove is of a design wherein the left-hand and right-hand portions thereof are symmetrical with each other with respect to the mid-center line drawn across the meter window 18 intermediately of the width thereof, and is substantially streamlined, when viewed from laterally thereof, so as to provide a pleasing and handsome layout and appearance in relation to the automobile instrument panel 10 and also to the air in the interior of the automobile body structure.

As best shown in FIGS. 1 to 4, and referring only to the left-hand portion of the meter covering 16 for the sake of brevity, an accommodation pocket 50 is formed at a corner area defined by the mounting wall 32 and the outer side wall 38. This pocket 50 is a recess defined by a continuous combination of opposite wall portions 38a and 38b, sloping wall portion 38c and upright wall portion 38d.

The right-hand portion of the meter covering 16 is substantially identical in construction and design with the above described left-hand portion thereof and, accordingly, elements in the right-hand portion of the meter covering 16 which correspond to the elements 50, 32a, 38a, 38b, 38c and 38d in the left-hand portion thereof are respectively designated by 52, 34a, 40a, 40b, 40c and 40d with the description thereof not reiterated for the sake of brevity.

It should, however, be noted that each of the pockets 50 and 52 in the left-hand and right-hand portions of the meter covering 16 is so designed and so defined as to open in two directions, i.e., towards the driver's seat through the respective cutout area 32a or 34a and in a direction laterally outwardly of and away from the body of the meter covering 16.

As best shown in FIGS. 1, 2, 4 and 5, each of the mounting walls 32 and 34 has a rectangular opening 32b or 34b defined therein, which opening 32b or 34b is covered by at least one respective display panel 54 or 56 having, so far shown, three display regions 54a, 54b and 54c or 56a, 56b and 56c.

So far shown, two groups of manipulatable switch knobs, the knobs of one group being designated by 58, 60 and 62 and those of the other group by 64, 66 and 68, are accommodated in the respective pockets 50 and 52 in a manner which will now be described.

Referring to FIGS. 1 to 4, the switch knob 58, 60 and 62 are each in the form of a piano key and are secured at one end to the levers 92, respectively, the respective free end portions of these knobs 58, 60 and 62 extending loosely through a cutout 38e, which is defined in the upright wall portion 38d and terminating so as to close the opening of the pocket 50 which faces towards the driver's seat. These switch knobs 58, 60 and 62 supported in the above described manner are so arranged and so positioned that, while they are aligned with the associated display regions 54a, 54b and 54c in side-by-side relation, they protrude in a plane generally parallel to the plane of rotation of the steering wheel 14 in a direction laterally outwardly of the associated display regions 54a, 54b and 54c. When and so long as all of switch assemblies operatively associated with these switch knobs 58, 60 and 62 as will be described subsequently are in off-states, i.e., switched off, all of the switch knobs 58, 60 and 62 lie in that plane generally parallel to the plane of rotation of the steering wheel 14 and in flush with the mounting wall 32. Also, these switch knobs 58, 60 and 62 are positioned one above the other in a direction generally perpendicular to the longitudinal sense of the instrument panel 10 or in a direction generally perpendicular to the widthwise direction of the automobile structure.

As best shown in FIGS. 1, 2 and 5, the switch knobs 64, 66 and 68 are also arranged in a manner similar to, the switch knobs 58, 60 and 62. While the specific manner by and in which these switch knobs 64, 66 and 68 are supported and arranged will, therefore, not be reiterated for the sake of brevity, it is to be noted that even these switch knobs 64, 66 and 68 extending laterally outwardly through a cutout 40e in the upright wall portion 40d of the outer side wall 40 lie in the same plane generally parallel to the plane of rotation of the steering wheel 14 and in flush with the mounting wall 34 when and so long as their associated switch assemblies are switched off.

For the purpose of the present invention, the switch knobs 58, 60, 62, 64, 66 and 68 are operatively associated with the following switch assemblies in a specified manner.

Switch Knob 58

Figure 8A:
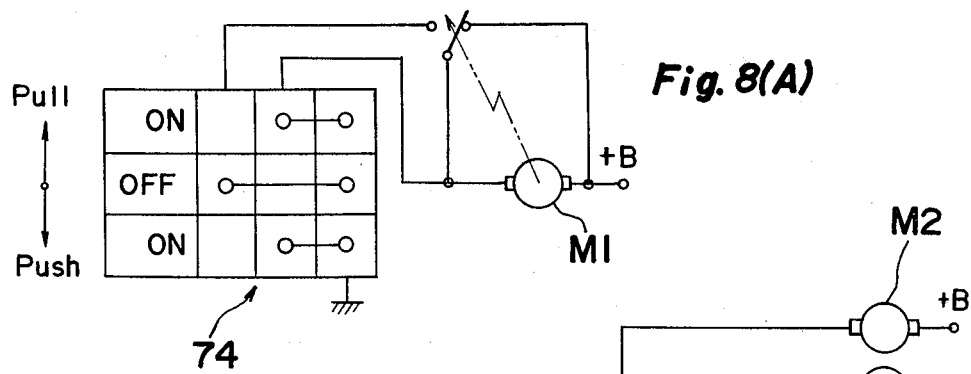

This knob 58 is operatively associated with a rear wiper switch assembly 74 for controlling an electric circuit, including a wiper motor M1 shown in FIG. 8(A), for a rear windshield wiper. This knob is pivotable from a neutral or off position to any one of the pushed on-position, wherein the knob 58 is pivoted inwardly of the pocket 50, and the pulled on-position wherein the knob 58 is pivoted outwardly of the pocket 50. The rear wiper switch assembly 74 associated with this knob 58 is of a type having a latch mechanism and is so designed that, when the knob 58 is pushed, the latch mechanism can hold the knob 58 in the pushed on-position on the one hand and the rear wiper switch assembly can be turned on to complete a power supply circuit for the wiper motor M1 so long as the knob 58 is in the pushed on-position on the other hand and that, when the knob 58 is pulled, the latch mechanism will not operate and the rear wiper switch assembly 74 can be turned on to complete the power supply circuit for the motor M1 so long as the knob 58 is pulled. The latch mechanism built in the rear wiper switch assembly 74 when operated to hold the knob 58 in the pushed on-position can be disabled when an external pulling force is applied to the knob 58 to return it to the neutral or off position.

Switch Knob 60

Figure 8B:
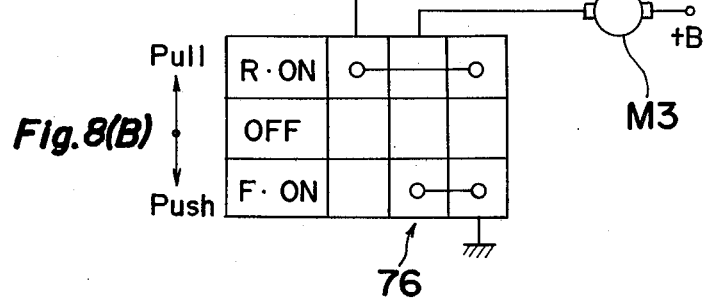

This knob 60 is operatively associated with a washer switch assembly 76 for controlling both of electric circuits including respective rear and front washer motors M2 and M3, shown in FIG. 8(B), for jetting a washing liquid onto the rear and front windshields. As is the case with the knob 58, this knob 60 is also pivotable from a neutral or off position to any one of pushed and pulled on-positions one at a time and the washer switch assembly 76 can be turned on to complete the power supply circuit for the rear washer motor M2 and that for the front washer motor M3, one at a time, when the knob 60 is pushed and pulled, respectively. The washer switch assembly 76 has no latch mechanism built therein and, therefore, the knob 60 can automatically return to the neutral position once an external pushing or pulling force applied thereto is released, with the washer switch assembly 76 consequently turned off.

Switch Knob 62

Figure 8C:
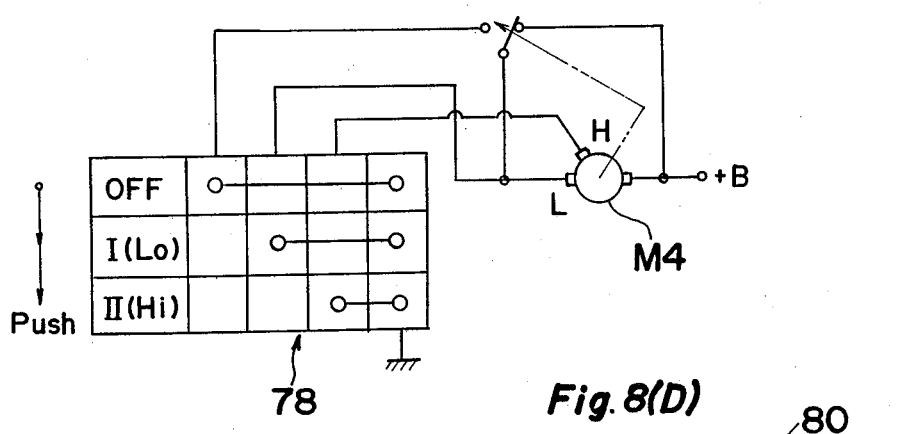

This knob 60 is operatively associated with a front wiper switch assembly 78 for controlling an electric circuit including a front wiper motor M4, shown in FIG. 8(C), for a front windshield wiper. This knob 60 is pivotable from a neutral or off position to any of first and second pushed on-positions which are located inwardly of the pocket 50. The front wiper switch assembly 78 associated with this knob 62 is of a type having a latch mechanism and is so designed that, when the knob 62 is pushed to the first pushed on-position, the latch mechanism can hold the knob 62 in the first pushed on-position on the one hand and the front wiper switch assembly 78 can be turned on to complete a low speed power supply circuit for driving the motor M4 at a low speed on the other hand and that, when the knob 62 is pushed to the second pushed on-position past the first pushed on-position, the latch mechanism can hold the knob 62 in the second pushed on-position on the one hand and the front wiper switch assembly 78 can be turned on to complete a high speed power supply circuit for driving the motor M4 at a high speed on the other hand. Return of the knob 62 from any one of the first and second pushed on-position released by the latch mechanism can be effected by pulling the knob 62 towards the neutral or off position.

Switch Knob 64

Figure 8D:
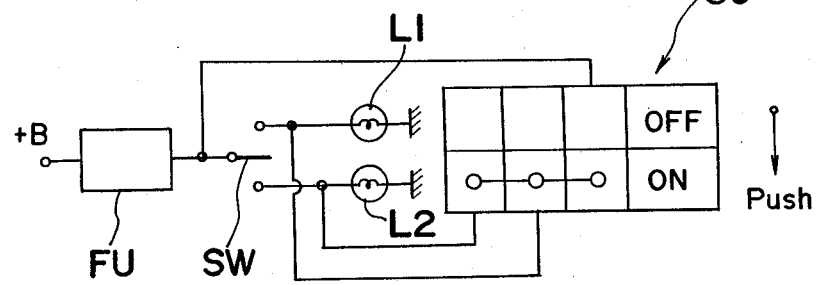

This switch knob 64 is operatively associated with a hazard indicator switch assembly 80 for controlling an electrical circuit including turn signaling lamps L1 and L2, shown in FIG. 8(D), which are usually fed with an electrical power from a flasher unit FU by way of a winker switch SW. This switch assembly 80 is electrically connected with the turn signaling lamps L1 and L2 so that, when it is turned on, both or all of these lamps L1 and L2 can be directly connected therethrough to the flasher unit FU to cyclically turn the lamps L1 and L2 on and off irrespectively of the position of the winker switch SW. For this purpose, the knob 64 is pivotable from a neutral position or off position to a pushed on-position, at which the switch assembly 80 is turned on, and can be retained thereat by a latch mechanism built in the switch assembly 80. The latch mechanism in the switch assembly 80 releases the knob 64 to allow the latter to return from the pushed on-position to the neutral or off position when an external pulling force is applied to the knob 64.

Switch Knob 66

This switch knob 66 is operatively associated with a defogger switch assembly 82 for controlling a power supply circuit for a defogger or heating wire H in the rear windshield as shown in FIG. 8(E) and is pivotable from a neutral or off position to a pushed on-position to turn the switch assembly 82 on to energize the heating wire H. This switch assembly 82 may be identical with the switch assembly 80 and, therefore, the knob 66 can be retained at the pushed on-position once it has been pushed thereto, but can be returned from the pushed on-position to the neutral or off position by pulling it towards the steering wheel 14.

Switch Knob 68

This switch knob 68 is operatively associated with a headlight switch assembly 84 for controlling an electric circuit including small lamps SL and headlight lamps HL as shown in FIG. 8(F). The headlight switch assembly 84 may be of identical construction with the front wiper switch assembly 78 and, therefore, the knob 68 is pivotable from a neutral or off position to a first pushed on-position in which, while the knob 68 is locked thereat by the latch mechanism built in the switch assembly 84, the small lamps SL are lit, or to a second pushed on-position past the first pushed on-position in which, while the knob 68 is locked thereat by the latch mechanism, the headlight lamps HL are lit. Return of the knob 68 from any one of the first and second pushed on-positions released by the latch mechanism can be similarly effected by pulling the knob 62 towards the neutral or off position.

Important to note is that the direction in which the knob 58 is pivoted from the neutral position towards the pulled on-position and that in which the knob 60 is pivoted from the neutral position towards the pulled on-position are identical with each other and that the direction in which the knob 60 is pivoted from the neutral position towards the pushed on-position and that in which the knob 62 is pivoted from the neutral position towards any one of the first and second pushed on-position are identical with each other. This arrangement make it possible that, only by pulling the knobs 58 and 60 simultaneously so as to cause them to pivot towards the respective pulled on-position, the rear wiper motor M1 and the rear washer motor M2 are simultaneously energized and that, only by pushing the knobs 60 and 62 simultaneously so as to cause them to pivot towards the pulled on-position and any one of the first and second pushed on-positions, the front washer motor M3 and the front wiper motor M4 are simultaneously energized, thereby eliminating the necessity of such complicated and expensive electric circuit connections as have been proposed in the prior art.

It is to be noted that, as best shown in FIG. 1, the display regions 54a, 54b, 54c, 56a, 56b and 56c of the display 54 and 56 have respective indicia, imprinted or embossed thereon, which indicia signify the respective functions of the switch knobs 58, 60, 62, 64, 66 and 68 together with the respective switching positions of the associated switch assemblies 74, 76, 78, 80, 81 and 84. In addition, these display regions of the display panels 54 and 56 are adapted to be individually illuminated from behind by respective illuminator lamps when the related switch assemblies 74, 76, 78, 80, 82 and 84 are turned on by manipulating the associated knobs 58, 60, 62, 64, 66 and 68, only two of said illuminator lamps being shown by 86 and 88 in FIGS. 4 and 5 in association with the display regions 54b and 56b, respectively.

Hereinafter, the manner by which the switch assemblies 74, 76, 78, 80, 82 and 84 are operatively coupled with the associated switch knobs 58, 60, 62, 64, 66 and 68 will be described with particular reference to FIGS. 4 to 7. It is to be noted that the following description will be taken in conjunction with the switch assemblies 76 and 82 and their related knobs 60 and 66 for the sake of brevity, it being, however, to be understood that the following description equally applies to the connection of the other switch assemblies with the associated knobs except for the difference in type of the switch assemblies which has previously been discussed.

Figure 6:
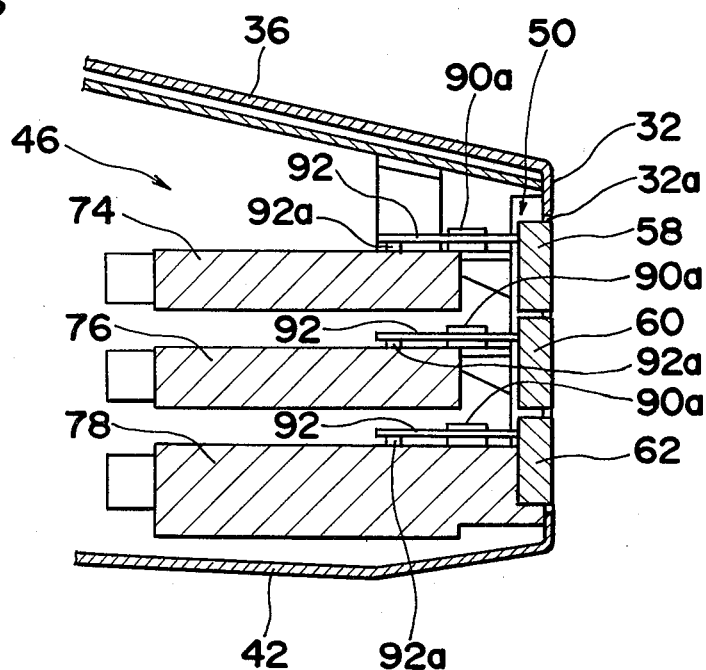
FIGS. 6 and 7 are cross-sectional views, on an enlarged scale, taken along the respective lines VI—VI and VII—VII in FIG. 1.

Referring first to FIGS. 4 and 6, the mounting wall 32 has a hinge structure 90 secured thereto generally in alignment with the display region 54b and confronting the chamber 46. The hinge structure 90 has a hinge pin 90a for pivotally supporting a generally L-shaped lever 92 having one end mounted on the hinge pin and the other end rigidly connected to the associated switch knob 60. Although not shown, the hinge structure 90 has a biasing element for biasing the associated knob 60 so as to assume the neutral position when the latch mechanism in the related switch assembly 76 has released so that it can automatically return to the neutral position. As has already been understood from the foregoing, the neutral or off position of the knob 60 is such that the knob 60 lies in a plane substantially in flush with the mounting wall 32, particularly the outer surface of the mounting wall 32.

The generally L-shaped lever 92 carries an actuating pin 92a projecting from a generally bent portion thereof in a direction at right angles to the plane of pivotal movement of such lever 92 and towards the associated switch assembly 76. This actuating pin 92a projecting in the above described manner terminates in engagement with an actuator (not shown) of the associated switch assembly 76 such that the switch assembly 76 can be controlled. It is to be noted that, once the switch assembly 76 is turned on and even if the related knob 60 returns to the neutral position, the switch assembly 76 can be held in the on-position by the action of the built-in latch mechanism.

Figure 7:
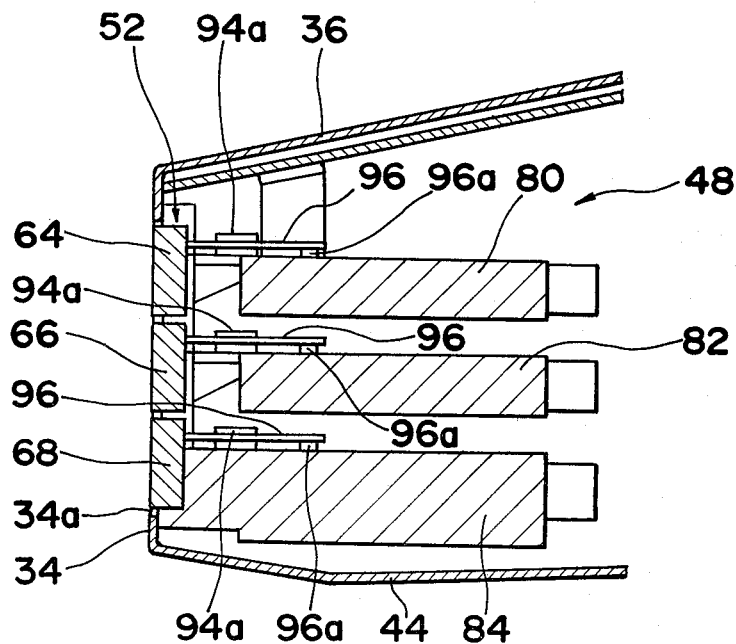

Referring now to FIGS. 5 and 7, like elements corresponding to the elements 90, 90a, 92 and 92a described above with reference to FIGS. 4 and 6 are shown by 94, 94a, 96 and 96a.

While the switch mounting according to the present invention is constructed with the switch assemblies arranged in the manner as hereinbefore described, the manipulatable switch knobs can be operated in a manner as will now be described. By way of example, should the automobile driver sitting on the driver's seat inside the automobile body structure, desire to operate the front windshield wipers while the washing liquid is jetted onto the front windshield, what he should do is to apply a single stroke of push to the switch knobs 60 and 62 to cause the latter to be pivoted from the neutral positions towards the pushed on-positions simultaneously so that the associated switch assemblies 76 and 78 can be turned on to energize the wiper motor M4 and the front washer motor M3. This can readily be achieved by using one or two fingers of the driver's left hand without the driver's right hand required to leave temporarily from the steering wheel 14.

Similarly, where the rear windshield wiper is desired to be operated while the washing liquid is jetted onto the rear windshield, a single stroke of pull should be applied to the switch knobs 58 and 60 to cause the latter to be simultaneously pulled towards the respective pulled on-positions so that the rear wiper motor M1 and the rear washer motor M3 can be energized. At this time, the driver will not be forced to feel difficulty in pulling the knobs 58 and 60 because a portion of the pocket 50 behind the column of the switch knobs 58, 60 and 62 as viewed from the driver's seat provides an access to the driver's finger or fingers.

In the case where the heating wire H for the rear windshield defogger is desired to be energized, a single push to the switch knob 66 to cause the latter to pivot to the pushed on-position serves the purpose. Since the knob 66 can be locked at the pushed on-position by the latch mechanism in the associated switch assembly 82, the knob 66 should be pulled frontwardly towards the driver to cause it to return to the neutral position where the heating wire H once energized with the knob 66 pivoted to the pushed on-position is desired to be deenergized. Even a portion of the recess 52 behind the column of the switch knobs 64, 66 and 68 as viewed from the driver's seat provides an access to the driver's finger or fingers of his or her right hand and, therefore, there is no difficulty in pulling the knob 66 as well as any other knobs 64 and 68.

In all cases, the movement of any one of the switch knobs 58, 60, 62, 64, 66 and 68 can be transmitted to the actuator of the associated switch assembly 74, 76, 78, 80, 82 or 84 through the associated L-shaped lever 92 or 96 supported pivotally by the respective hinge structure 90 or 94.

Where the automobile is equipped with neither the rear windshield wiper nor its associated electric circuit such as shown in FIG. 8(A), the switch knob 58 and its associated switch assembly 74 may be used for a different purpose, an electric circuit necessary to achieve this purpose being shown in FIG. 9.

Referring to FIG. 9, the switch assembly which has been described as used for controlling the electric circuit for the rear windshield wiper and is operatively associated with the switch knob 58 is, as identified by 75 in FIG. 9, of a type having on and off positions and capable of being turned on when and so long as the switch knob 58 is in the pushed on-position. On the other hand, as a matter of course, the electric circuit for the washer does not include the rear washer motor such as used in the circuit shown in FIG. 8(B), but only the front washer motor M3 and, therefore, the switch assembly operatively associated with the switch knob 60, identified by 77 in FIG. 9, is of a type which is turned on when and so long as the switch knob is in the pushed on-position.

Accordingly, it will readily be seen that, when and so long as the switch knobs 58 and 60 are simultaneously pushed, the front washer motor M3 and the front wiper motor M4 are energized. However, when external finger pressures applied to the knobs 58 and 60 are released, the knobs 58 and 60 return to their neutral positions with the switch assemblies 75 and 77 consequently turned off. This is particularly advantageous where, while it does not rain, the front windshield is desired to be wiped off to remove dirts and stains on the front windshield. On the other hand, where the washing liquid is desired to be jetted onto the front windshield while the front windshield is in continuous operation with the switch knob 62 held in one of the first and second pushed on-positions, a single push to the knob 60 serves the purpose.

Even in the embodiment represented by the circuit shown in FIG. 9, the directions in which the switch knobs 58, 60 and 62 should be moved to turn on the associated switch assemblies 75, 77 and 78 remain the same.

From the foregoing description, it has now become clear that two or more mechanisms which are functionally related to each other and which should be, or are desired to be, controlled simultaneously or sequentially, can be controlled only by moving the associated manipulatable switch knobs in the same direction. This substantially eliminates any complicated switch manipulating procedure which would otherwise require the driver steering the automobile to manipulate one switch knob to another while looking aside to see if his hand is in the right position accessible to the related switch knobs.

It is also clear that, since each group of the manipulatable switch knobs are closely adjacently positioned one above the other in a direction generally perpendicular to the longitudinal sense of the instrument panel and are, therefore, integrated in a limited space available or in as small a space as possible, the number of the manipulatable switch knobs of each group may not be limited to three such as shown, but may be four or more without the accessibility to these switch knobs being adversely affected and, also, without the steerability of the steering wheel being adversely affected. This feature can be appreciated where, such as in the foregoing embodiment described and illustrated, the switch knobs of each group are supported for pivotal movement in a plane generally perpendicular to the plane of rotation of the steering wheel or, in other words, frontwardly and rearwardly of the automobile body structure.

Where some of the manipulatable switch knobs are desired to be pulled frontwardly towards the steering wheel, that portion of the respective pocket 50 or 52 behind the column of the switch knobs of each group renders the driver's finger or fingers accessible to the switch knobs from behind. However, depending on the type of the switch assemblies and the purpose for which they are provided, that portion of the respective pockets 50 or 52 behind the column of the switch knobs may not be necessary and one or both of the pockets 50 and 52 may be so sized as to accommodate only the movement of the related switch knobs.

Although the present invention has fully been described in connection with the preferred embodiment with reference to the accompanying drawings, it should be noted that various changes and modifications are apparent to those skilled in the art. By way of example, although the switch knobs 58, 60 and 62 in the left-hand portion of the gauge covering has been described as used for controlling the switch assemblies for the rear windshield wiper, the front and rear windshield washer and the front windshield wiper, respectively, the order of arrangement may not be limited thereto and the switch knobs 58 and 62 may, for example, be reversed in position with each other together with their associated switch assemblies. This equally applies to the order of arrangement of the switch knobs 64, 66 and 68 in the right-hand portion of the gauge covering. In addition, the group of the switch knobs in the left-hand portion of the gauge covering and that in the right-hand portion thereof may be replaced with each other together with their associated switch assemblies.

It is to be noted that the meter covering hereinbefore referred to is generally referred to as an instrument cluster and may, therefore, be interchangeable with the term "instrument cluster", provided that the meter covering according to the present invention be understood as serving a dual function of shielding the meters from external light and also of supporting the meters and the switch assemblies.

Accordingly, such changes and modifications are to be understood as included in the true scope of the present invention unless they depart therefrom.

We claim:

1. An apparatus for mounting various switches used to control different mechanisms in an automotive vehicle, which apparatus comprises:
    a meter housing mounted on an instrument panel rearwardly of a steering wheel as viewed from a driver's seat inside the automobile vehicle, said meter housing comprising a pair of opposite lateral portions, said lateral portions protruding from the instrument panel a certain distance towards the steering wheel, but spaced from said steering wheel, at least one of said lateral portions having a chamber defined therein for accommodating at least some of the various switches therein, a portion of the wall defining the chamber being inwardly recessed to define a pocket;
    manipulatable switch knobs operatively connected to the switches, said switch knobs being accommodated in said pocket one above the other in a direction generally perpendicular to the longitudinal direction of the instrument panel and protruding widthwise of the vehicle in a plane generally parallel to the plane of rotation of the steering wheel in closely adjacent relation to each other, each of said switch knobs being supported for movement in a plane generally perpendicular to the plane of rotation of the steering wheel; and
    means positioned within the chamber for transmitting the movement of the switch knobs to the associated switches to control said associated switches, respectively.

2. An apparatus as claimed in claim 1, wherein said pocket is defined at a corner area of the lateral portion of the meter housing.

3. An apparatus as claimed in claim 1 or 2, wherein a wall portion defining the pocket has an opening defined therein for communicating the chamber to the outside of the meter housing through the pocket, said switch knobs extending loosely through said opening with one ends of said switch knobs situated within the chamber and linked to the associated switches through the respective transmitting means.

4. An apparatus as claimed in claim 3, wherein all of said switch knobs, when not moved, lie in a plane generally flush with the plane in which the lateral portions of the meter housing that project from the instrument panel terminate.

5. An apparatus for mounting various switches used to control different mechanisms in an automotive vehicle, which apparatus comprises:
    a meter housing mounted on an instrument panel rearwardly of a steering wheel as viewed from a driver's seat inside the automotive vehicle, said meter housing having a meter display area through which a plurality of meters are viewable and comprising a pair of opposite lateral portions on sides of the display area, said lateral portions protruding from the instrument panel a certain distance towards the steering wheel but spaced from the steering wheel, each of said lateral portions having a chamber defined therein, said switches being grouped into first and second groups each group comprised of a plurality of the switches, said first and second groups of the switches being accommodated in the respective chambers in the lateral portions of the meter housing, a portion of the wall defining the respective chamber in each lateral portion of the meter housing being inwardly recessed to define a respective pocket;
    a first group of manipulatable knobs equal in number to the number of the switches of the first group and operatively linked thereto and accommodated in the pocket in one of the lateral portions of the meter housing;

a second group of manipulatable knobs equal in number to the number of the switches of the second group and operatively linked thereto and accommodated in the pocket in the other of the lateral portions of the meter housing;

a first means positioned within the chamber in said one of the lateral portions for transmitting the movement of the switch knobs of the first group to the associated switches of the first group, respectively, to control said switches; and a second means positioned within the chamber in said other of the lateral portions for transmitting the movement of the switch knobs of the second group to the associated switch of the second group to control said switches, respectively, wherein said switch knobs of each group are accommodated in the respective pocket one above the other in a direction generally perpendicular to the longitudinal direction of the instrument panel and protruding widthwise of the vehicle in a plane generally parallel to the plane of rotation of the steering wheel in closely adjacent relation to each other, and each of the switch knobs of each group is supported for movement in a plane generally perpendicular to the plane of rotation of the steering wheel.

6. An apparatus as claimed in claim 5, wherein the first group of the switches are used to control windshield cleaning systems including windshield wipers and windshield washers.

7. An apparatus as claimed in claim 6, wherein the second group of the switches are used to control electrooptical systems including headlight lamps and hazard warning lamps.

8. An apparatus as claimed in claim 6, wherein the directions in which the manipulatable knobs of the first group are moved to turn such switches of the first group on are the same.

9. An apparatus as claimed in claim 5, wherein each of the pockets is defined at a respective corner area of the associated lateral portion of the meter housing which faces in a direction away from the other lateral portion.

10. An apparatus as claimed in claim 5, 6, 7, 8 or 9, wherein a wall portion defining each of the pockets has a respective opening defined therein for communicating the chamber to the outside of the meter housing through the respective pocket, the corresponding group of the switch knobs extending loosely through said respective opening with one ends of said switch knobs of the corresponding group situated within the respective chamber and linked to the associated switches through the corresponding group of the transmitting means, and wherein said switch knobs of all of the groups, when not moved, lie in a plane generally flush with the plane in which the lateral and overhanging portions of the meter housing that project from the instrument panel terminate.

* * * * *